US009667424B2

United States Patent
Zhang et al.

(10) Patent No.: US 9,667,424 B2
(45) Date of Patent: May 30, 2017

(54) METHODS AND APPARATUSES FOR BINDING TOKEN KEY TO ACCOUNT

(71) Applicant: Xiaomi Inc., Beijing (CN)

(72) Inventors: Jun Zhang, Beijing (CN); Shen Li, Beijing (CN); Tingbin Wu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/612,536

(22) Filed: Feb. 3, 2015

(65) Prior Publication Data

US 2015/0381366 A1 Dec. 31, 2015

Related U.S. Application Data

(63) Continuation of application No. PCT/CN2014/089281, filed on Oct. 23, 2014.

(30) Foreign Application Priority Data

Jun. 26, 2014 (CN) .......................... 2014 1 0299506

(51) Int. Cl.
*H04L 29/06* (2006.01)
*H04L 9/32* (2006.01)
(Continued)

(52) U.S. Cl.
CPC .......... *H04L 9/3213* (2013.01); *G06F 21/335* (2013.01); *H04L 9/3297* (2013.01);
(Continued)

(58) Field of Classification Search
CPC ... H04L 63/0823; H04L 9/3247; H04L 63/10; H04L 47/125; H04L 47/147; H04L 12/66; H04L 9/3242; G06F 21/33
(Continued)

(56) References Cited

U.S. PATENT DOCUMENTS

| 2005/0033703 A1* | 2/2005 | Holdsworth | ............ G06F 21/34 705/67 |
| 2006/0059346 A1* | 3/2006 | Sherman | ............. H04L 63/0823 713/175 |

(Continued)

FOREIGN PATENT DOCUMENTS

| CN | 1635536 A | 7/2005 |
| CN | 101582762 | 11/2009 |

(Continued)

OTHER PUBLICATIONS

International Search Report of PCT/CN2014/089281, mailed from the State Intellectual Property Office of China on Apr. 1, 2015.
(Continued)

*Primary Examiner* — Evans Desrosiers
(74) *Attorney, Agent, or Firm* — Finnegan, Henderson, Farabow, Garrett & Dunner LLP

(57) ABSTRACT

A method for binding a token key to an account is provided. The method includes: sending a binding request message including information regarding the account, for a security authentication server to generate a certification link and a first token key corresponding to the account; receiving the certification link and the first token key from the server; generating display information based on the certification link and the first token key; receiving encrypted information from the server, wherein the encrypted information is generated according to the first token key and included in an access request message from a mobile terminal to the server; obtaining a second token key based on the encrypted information; determining that the second token key matches the first token key; and sending a binding success message to the server.

12 Claims, 10 Drawing Sheets

(51) Int. Cl.
*H04W 12/04* (2009.01)
*G06F 21/33* (2013.01)
*H04L 29/08* (2006.01)

(52) U.S. Cl.
CPC ..... *H04W 12/04* (2013.01); *G06F 2221/2151* (2013.01); *H04L 67/02* (2013.01)

(58) Field of Classification Search
USPC ........................................ 713/155; 726/1–30
See application file for complete search history.

(56) References Cited

U.S. PATENT DOCUMENTS

| | | | |
|---|---|---|---|
| 2009/0271847 | A1 | 10/2009 | Karjala et al. |
| 2010/0083363 | A1 | 4/2010 | Blinn et al. |

FOREIGN PATENT DOCUMENTS

| | | | |
|---|---|---|---|
| CN | 101582764 | A | 11/2009 |
| CN | 101730056 | A | 6/2010 |
| CN | 102098162 | A | 6/2011 |
| CN | 102487322 | A | 6/2012 |
| CN | 103023917 | A | 4/2013 |
| CN | 103067381 | A | 4/2013 |
| CN | 103179115 | | 6/2013 |
| CN | 103269273 | A | 8/2013 |
| CN | 103281186 | | 9/2013 |
| CN | 103716331 | A | 4/2014 |
| CN | 103795731 | A | 5/2014 |
| CN | 103929402 | A | 7/2014 |
| EP | 2 747 374 | A1 | 10/2013 |
| EP | 2 696 557 | A1 | 2/2014 |
| KR | 20120037330 | | 4/2012 |
| WO | WO 2008/011143 | A2 | 1/2008 |

OTHER PUBLICATIONS

European Search Report of European Application No. 15170533.2, dated Oct. 23, 2015. (6 pages).

English translation of International Search Report of International Application No. PCT/CN2014/089281, mailed from the State Intellectual Property Office of China on Apr. 1, 2015 (2 pages).

* cited by examiner

METHODS AND APPARATUSES FOR BINDING TOKEN KEY TO ACCOUNT

CROSS-REFERENCE TO RELATED APPLICATIONS

This application is a continuation of International Application No. PCT/CN2014/089281, filed Oct. 23, 2014, which is based upon and claims priority to Chinese Patent Application No. 201410299506.7, filed Jun. 26, 2014, the entire contents of all of which are incorporated herein by reference.

TECHNICAL FIELD

The present disclosure generally relates to the field of network security and, more particularly, to methods and apparatuses for binding a token key to an account.

BACKGROUND

With the development of Internet technology, various services are provided by websites, such as free mailbox, instant messaging, videos, and the like. Typically, for a user to utilize these services, the user needs to register an account and set a password on a designated webpage, and after successful registration, uses the account and the password to login in on the webpage, so as to use the services provided the website.

In order to improve the security of the account, a security authentication method is introduced in various websites, in which during the process of account login, a security token may also be used in addition to the password. The security token may be an application installed in a terminal device. Once a user binds a token key assigned by a server to the account, the token key may be used in subsequent logins, thereby improving the security of the account.

SUMMARY

According to a first aspect of the present disclosure, there is provided a method for binding a token key to an account, comprising: sending a binding request message including information regarding the account, for a server to generate a certification link and a first token key corresponding to the account; receiving the certification link and the first token key from the server; generating display information based on the certification link and the first token key; receiving encrypted information from the server, wherein the encrypted information is generated according to the first token key and included in an access request message from a mobile terminal to the server; obtaining a second token key based on the encrypted information; determining that the second token key matches the first token key; and sending a binding success message to the server.

According to a second aspect of the present disclosure, there is provided a method for binding a token key to an account, comprising: receiving display information from a web server, wherein the display information is associated with a certification link and a first token key generated by a security authentication server according to the account; acquiring the certification link and the first token key based on the display information; generating encrypted information based on the first token key; and sending to the security authentication server an access request message including the encrypted information and the certification link.

According to a third aspect of the present disclosure, there is provided a web server, comprising: a processor; and a memory for storing instructions executable by the processor. The processor is configured to: send a binding request message including information regarding an account, for a security authentication server to generate a certification link and a first token key corresponding to the account; receive the certification link and the first token key from the security authentication server; generate display information based on the certification link and the first token key; receive encrypted information from the security authentication server, wherein the encrypted information is generated according to the first token key and included in an access request message from a mobile terminal to the security authentication server; obtain a second token key based on the encrypted information; determine that the second token key matches the first token key; and send a binding success message to the security authentication server.

According to a fourth aspect of the present disclosure, there is provided a mobile terminal, comprising: a processor; and a memory for storing instructions executable by the processor. The processor is configured to: receive display information from a web server, wherein the display information is associated with a certification link and a first token key generated by a security authentication server according to an account; acquire the certification link and the first token key based on the display information; generate encrypted information based on the first token key; and send to the security authentication server an access request message including the encrypted information and the certification link.

It is to be understood that both the foregoing general description and the following detailed description are exemplary rather than limiting the present disclosure.

BRIEF DESCRIPTION OF THE DRAWINGS

The accompanying drawings, which are hereby incorporated in and constitute a part of this specification, illustrate embodiments consistent with the present invention and, together with the description, serve to explain the principles of the present invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
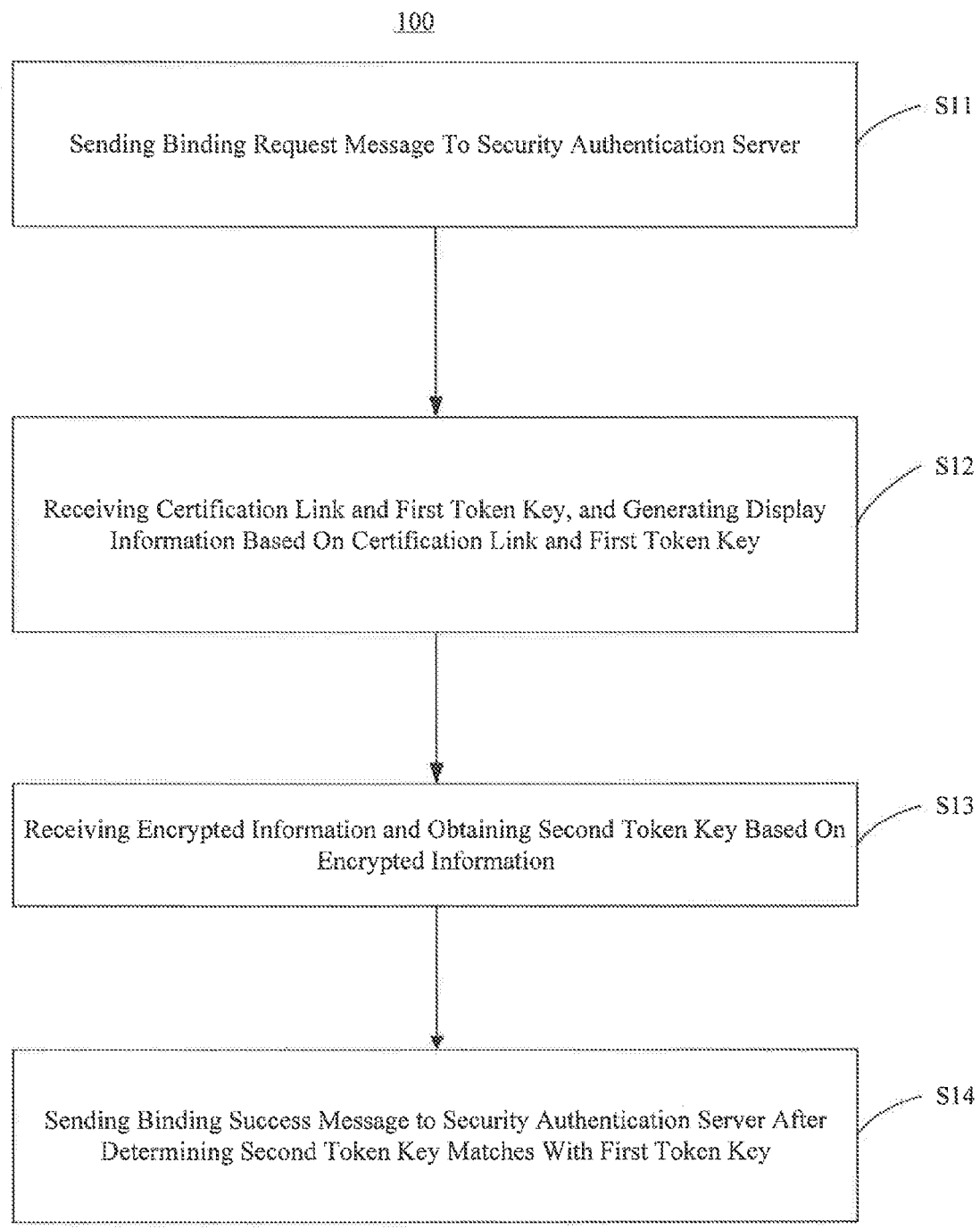
FIG. 1 is a flowchart of a method for binding a token key to an account at a web server, according to an exemplary embodiment.

FIG. 1 is a flowchart of a method 100 of binding a token key to an account, according to an exemplary embodiment. For example, the method 100 may be used in a web server. Also for example, the web server is configured to manage accounts logging in a web site. Referring to FIG. 1, the method 100 includes the following steps.

In step S11, the web server sends to a security authentication server a binding request message including information regarding an account. For example, the security authentication server is configured to perform security authentication. In some embodiments, the security authentication server and the web server may be integrated together as one server. Accordingly, the security authentication server may generate a certification link and a first token key corresponding to the account.

For example, when a user wants to bind a token key to the account, the user may download a security token application onto a mobile terminal, and initiate a binding request after logging in the account at a webpage using the security token application. The web server of the webpage then sends the binding request message to the security authentication server, which includes information regarding the account.

The security authentication server may generate the certification link and the first token key based on the account in the binding request message. The certification link may be a uniform resource locator (URL), and the like.

In step S12, the web server receives the certification link and the first token key from the security authentication server, and generates display information based on the certification link and the first token key. The mobile terminal may obtain encrypted information based on the first token key. The mobile terminal may subsequently send an access request message to the security authentication server including the certification link and the encrypted information. After receiving the access request message, the security authentication server may send the encrypted information to the web server.

In exemplary embodiments, after viewing the display information, the user may use the mobile terminal to acquire the certification link and the first token key from the display information. The manner for acquiring the certification link and the first token key may be different according to different types of the display information. For example, if the display information is a two-dimensional code, the certification link and the first token key may be acquired by scanning the two-dimensional code using the mobile terminal. As another example, if the display information is a bar code, the certification link and the first token key may also be acquired by scanning the bar code using the mobile terminal.

After acquiring the first token key based on the display information, the mobile terminal may generate encrypted information based on the first token key, and then send to the security authentication server an access request message including the certification link and the encrypted information. After receiving the access request message, the security authentication server may acquire the encrypted information in the access request message, and then send the encrypted information to the web server.

In step S13, the web server receives the encrypted information, and obtains a second token key based on the encrypted information.

In step S14, the web server sends a binding success message to the security authentication server after it is determined that the second token key matches the first token key, so that the security authentication server may bind the first token key to the account.

When subsequently logging in the account, the user may use the password and the first token key stored in the mobile terminal, thereby enhancing the security for the account. If the second token key does not match the first token key, which may occur when the second token key has been replaced during the transmission of the encrypted information, a binding failure message may be sent to the security authentication server and may also be displayed on the mobile terminal or on a webpage. After viewing the message, the user may resend the binding request, to request for binding the token key to the account.

In the illustrated embodiment, during the process of binding the token key to the account, the mobile terminal receives the display information, and then generates the encrypted information according to the first token key in the display information. The user does not need to input the token information into the mobile terminal, thereby simplifying the user operation, and improving user experience.

In exemplary embodiments, the web server may generate the display information based on the certification link, the first token key and/or the account. Subsequently the mobile terminal may generate the encrypted information by performing a hash operation according to the first token key and the account, or according to the first token key, the account, and a timestamp. The time stamp may be acquired from the mobile terminal.

Accordingly, after acquiring the encrypted information, the security authentication server forwards the encrypted information to the web server, and the web server may also use the hash operation to decode the encrypted information to obtain a second token key.

Figure 2:
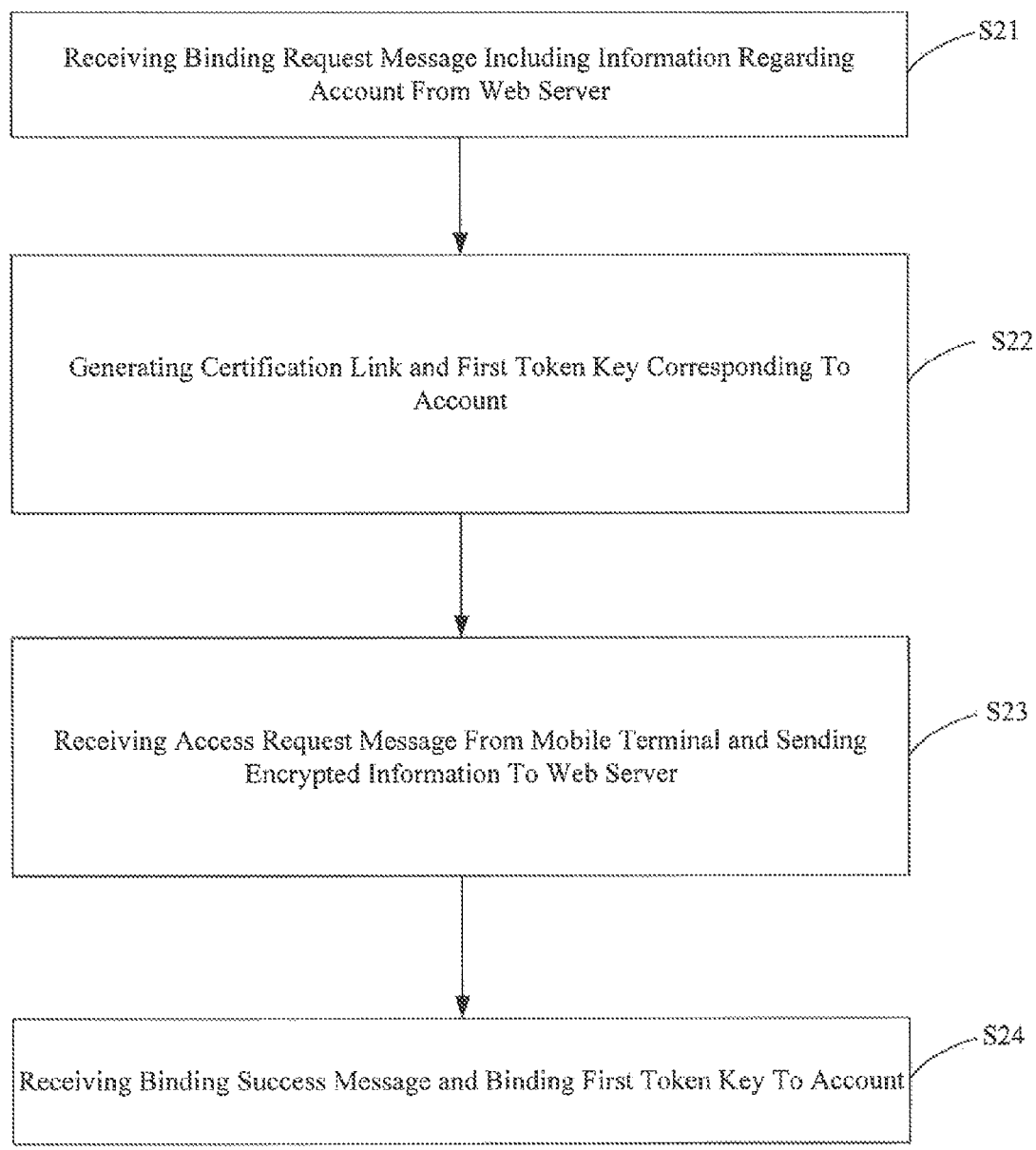
FIG. 2 is a flowchart of a method for binding a token key to an account at a security authentication server, according to an exemplary embodiment.

FIG. 2 is a flowchart of a method 200 of binding a token key to an account, according to an exemplary embodiment. For example, the method 200 may be used in a security authentication server. Also for example, the security authentication server is configured to perform security authentication. Referring to FIG. 2, the method 200 includes the following steps.

In step S21, the security authentication server receives from a web server a binding request message including information regarding an account. For example, the web server is configured to manage accounts logging in a web site. In some embodiments, the security authentication server and the web server may be integrated together as one server.

In step S22, the security authentication server generates a certification link and a first token key corresponding to the account. The web server may in turn generate display information based on the certification link and the first token key. The mobile terminal may generate encrypted information based on the first token key and send to the security authentication server an access request message including the certification link and the encrypted information.

In step S23, the security authentication server receives the access request message from the mobile terminal and sends the encrypted information to the web server. The web server may subsequently obtain a second token key based on the encrypted information, and send a binding success message to the security authentication server after determining that the second token key matches the first token key.

In step S24, the security authentication server receives the binding success message and binds the first token key to the account.

In order to ensure that the binding may be completed in time, the security authentication server may establish a communication link with the web server. If the access request message is not received from the mobile terminal within a predetermined period of time, the communication link with the web server may be released, and network resources may be released, thereby saving the network resources.

Figure 3:
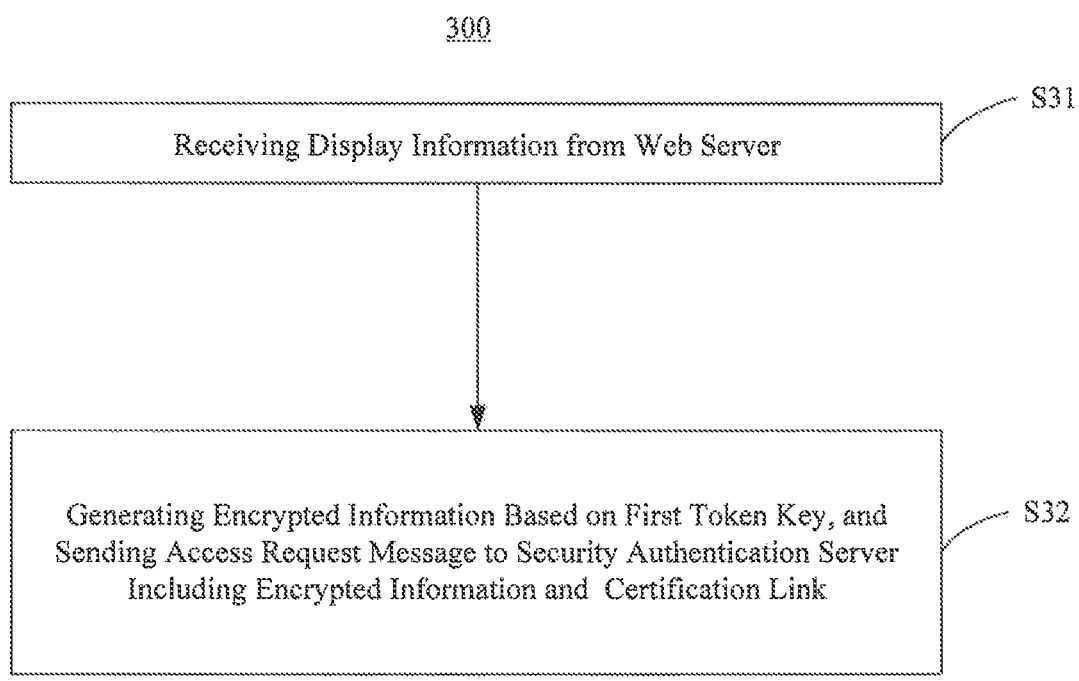
FIG. 3 is a flowchart of a method for binding a token key to an account by a mobile terminal, according to an exemplary embodiment.

FIG. 3 is a flowchart of a method 300 of binding a token key to an account, according to an exemplary embodiment. For example, the method 300 may be used in a mobile terminal. Referring to FIG. 3, the method 300 includes the following steps.

In step S31, the mobile terminal receives display information from a web server. The display information may be generated by the web server based on a certification link and a first token key, and the certification link and the first token key may be generated by the security authentication server based on the account information received from the web server.

In step S32, the mobile terminal generates encrypted information based on the first token key, and sends to the security authentication server an access request message including the encrypted information and the certification link. The security authentication server may send the encrypted information to the web server after receiving the access request message. The web server may obtain a second token key based on the encrypted information, and send a binding success message to the security authentication server after determining that the second token key matches the first token key. The security authentication server may bind the token key to the account after receiving the binding success message.

In some embodiments, in step S32, the mobile terminal may generate the encrypted information by performing a hash operation based on a timestamp, the first token key, and/or the account.

Figure 4:
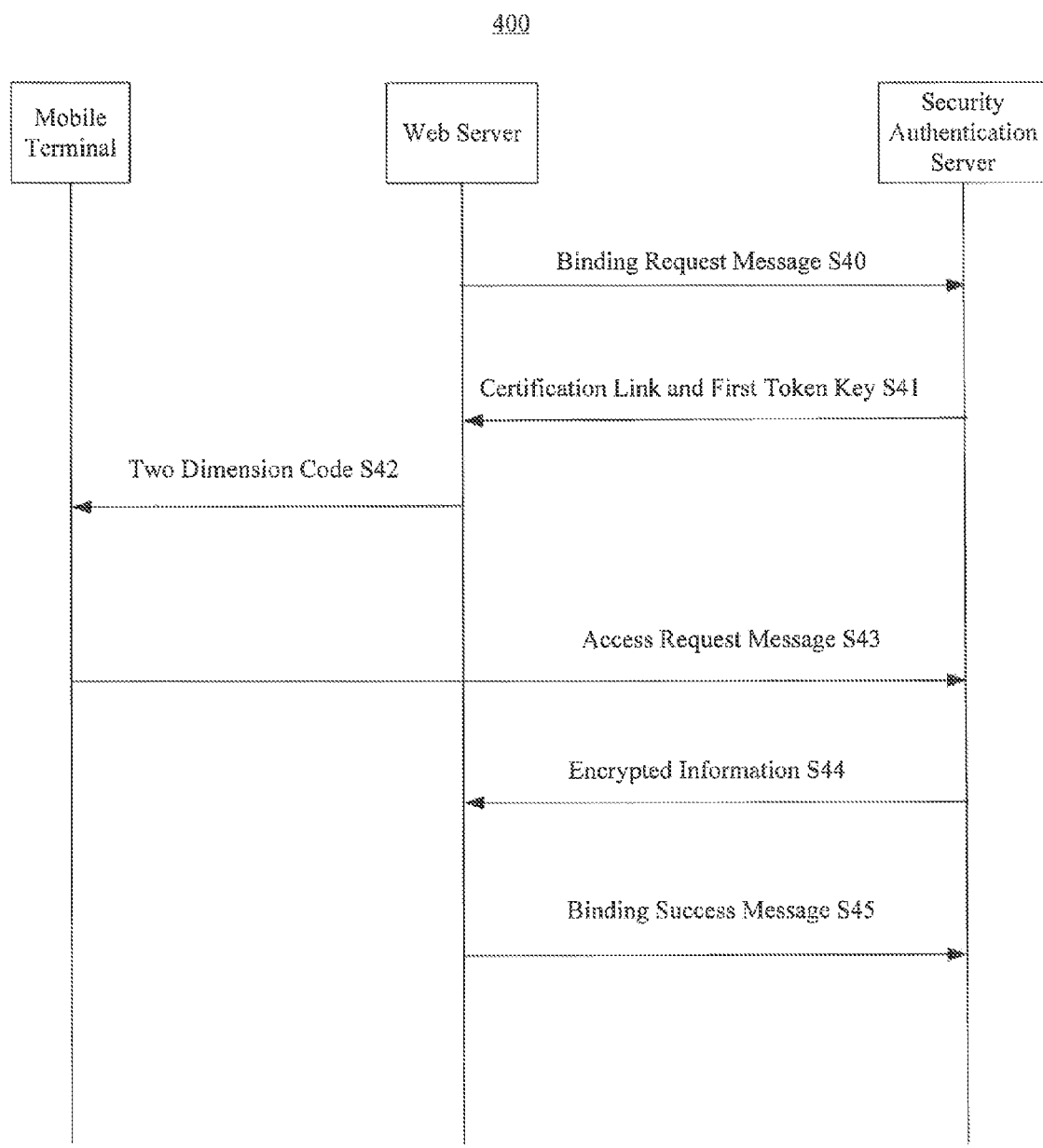
FIG. 4 is a flow diagram of a method for binding a token key to an account, according to an exemplary embodiment.

FIG. 4 is a flow diagram of a method 400 for binding a token key to an account, according to an exemplary embodiment. As shown in FIG. 4, the method 400 can be used in a system including a mobile terminal, a web server, and a security authentication server.

In step S40, the web server sends a binding request message including information regarding an account to the security authentication server.

After receiving the binding request message, the security authentication server generates a certification link and a first token key corresponding to the account. In step S41, the security authentication server sends the certification link and the first token key to the web server.

After receiving the certification link and the first token key, the web server generates, e.g., a two-dimensional code based on the certification link, the first token key, and/or the account. In step S42, the web server sends the two-dimensional code to the mobile terminal.

After receiving the two-dimensional code, the mobile terminal performs a hash operation based on a timestamp, and the first token key and the account in the two-dimensional code, to generate encrypted information. In step S43, the mobile terminal sends an access request message including the certification link and the encrypted information to the security authentication server.

In step S44, the security authentication server sends the encrypted information to the web server after receiving the access request message.

The web server decodes the encrypted information to obtain a second token key using the hash operation. If the second token key matches the first token key, in step S45, the web server sends a binding success message to the security authentication server.

The security authentication server binds the first token key to the account after receiving the binding success message.

When a user subsequently logs in an account, the user may use the first token key and the password to log in, thereby enhancing the security of the account.

Figure 5:
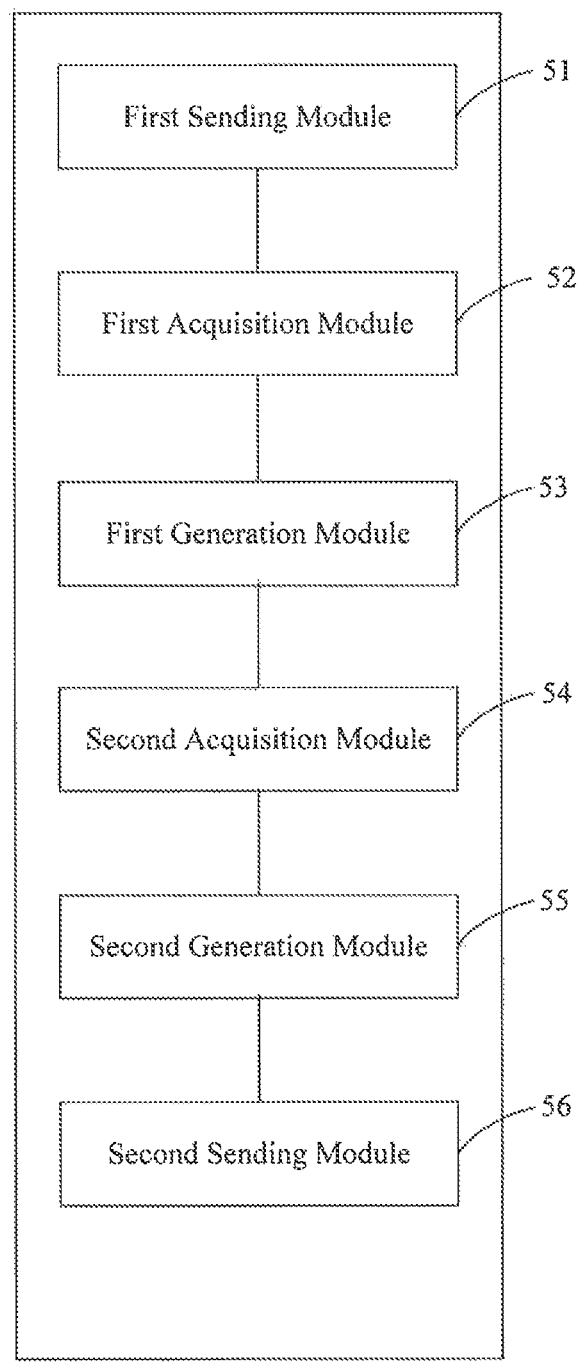
FIG. 5 is a block diagram of an apparatus for binding a token key to an account, according to an exemplary embodiment.

FIG. 5 is a block diagram of an apparatus 500 for binding a token key to an account at a web server, according to an exemplary embodiment. Referring to FIG. 5, the apparatus 500 includes a first sending module 51, a first acquisition module 52, a first generation module 53, a second acquisition module 54, a second generation module 55, and a second sending module 56.

The first sending module 51 is configured to send to a security authentication server a binding request message including information regarding an account. The security authentication server may subsequently generate a certification link and a first token key corresponding to the account, and send the certification link and the first token key to the web server.

The first acquisition module 52 is configured to acquire the certification link and the first token key.

The first generation module 53 is configured to generate display information based on the certification link and the first token key, so that the mobile terminal may generate encrypted information based on the first token key. The mobile terminal may subsequently send to the security authentication server an access request message including the certification link and the encrypted information, and the security authentication server may in turn forward the encrypted information to the web server after receiving the access request message.

The second acquisition module 54 is configured to acquire the encrypted information.

The second generation module 55 is configured to obtain a second token key according to the encrypted information.

The second sending module 56 is configured to send a binding success message to the security authentication server after determining that the second token key matches the first token key.

In some embodiments, the first generation module 53 is configured to generate the display information based on the certification link, the first token key, and/or the account. The mobile terminal may subsequently generate the encrypted information by performing a hash operation using the first token key, the account, and/or a timestamp.

Figure 6:
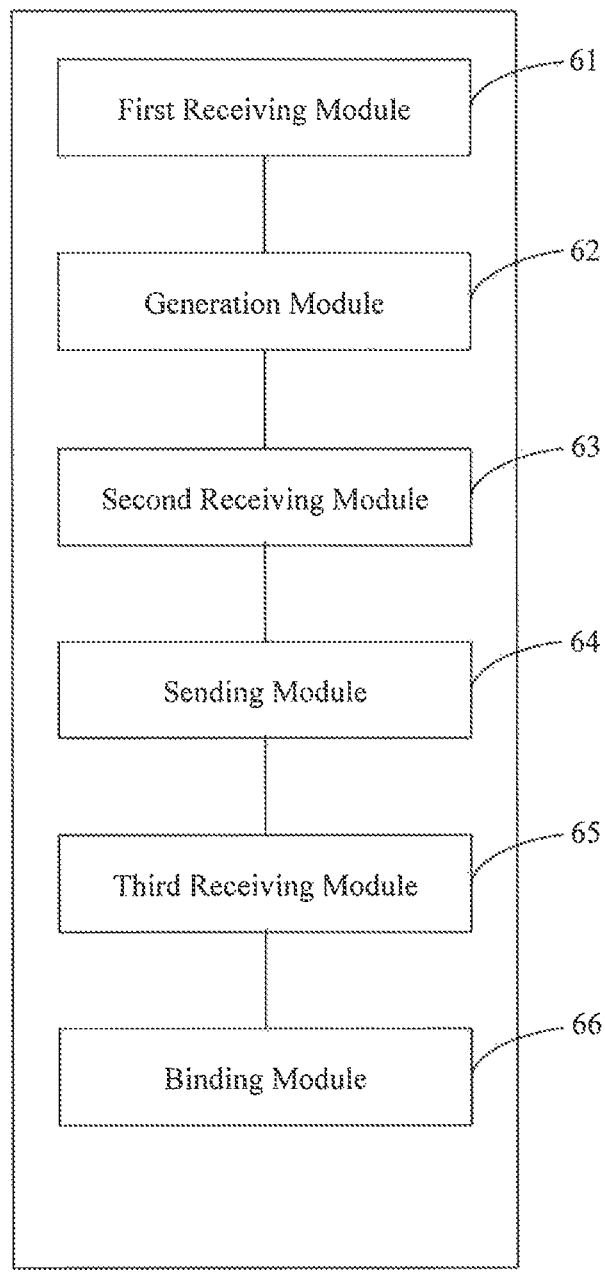
FIG. 6 is a block diagram of an apparatus for binding a token key to an account, according to an exemplary embodiment.

FIG. 6 is a block diagram of an apparatus 600 for binding a token key to an account at a security authentication server, according to an exemplary embodiment. Referring to FIG. 6, the apparatus 600 includes a first receiving module 61, a generation module 62, a second receiving module 63, a sending module 64, a third module 61, a generation module 62, a second receiving module 63, a sending module 64, a third receiving module 65, and a binding module 66.

The first receiving module 61 is configured to receive from a web server a binding request message including information regarding an account.

The generation module 62 is configured to generate a certification link and a first token key corresponding to the account. The web server may generate display information based on the certification link and the first token key, and the mobile terminal may generate encrypted information based on the first token key and send an access request message to the security authentication server including the certification link and the encrypted information.

The second receiving module 63 is configured to receive the access request message.

The sending module 64 is configured to send the encrypted information to the web server. The web server may obtain a second token key based on the encrypted information, and send a binding success message to the security authentication server after determining that the second token key matches the first token key.

The third receiving module 65 is configured to receive the binding success message.

The binding module 66 is configured to bind the first token key to the account.

Figure 7:
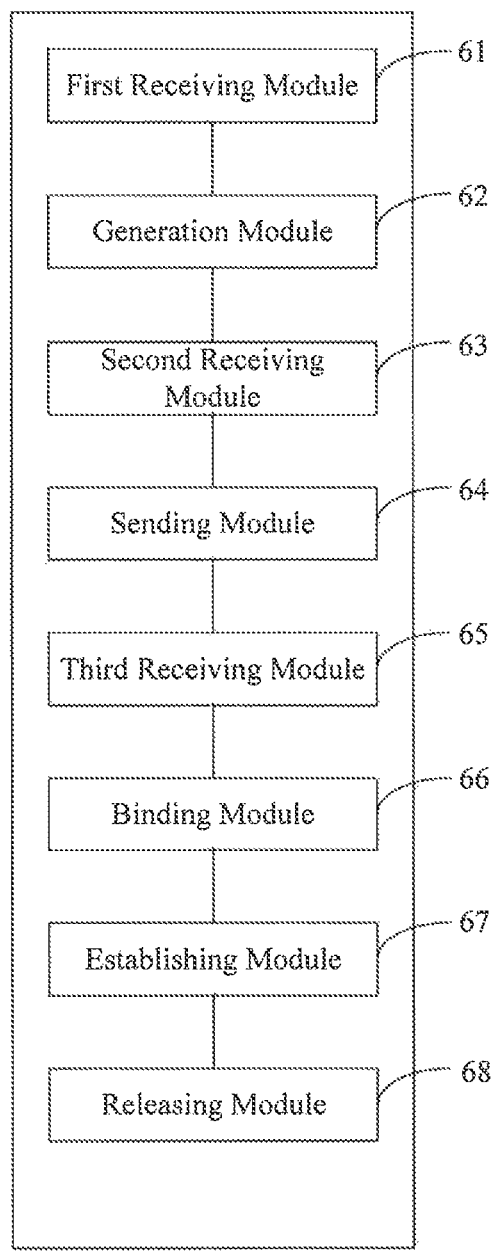
FIG. 7 is a block diagram of an apparatus for binding a token key to an account, according to an exemplary embodiment.

FIG. 7 is a block diagram of an apparatus 700 for binding a token key to an account at a security authentication server, according to an exemplary embodiment. The apparatus 700 further includes an establishing module 67 and a releasing module 68, in addition to the components of the apparatus 600 shown in FIG. 6.

The establishing module 67 is configured to establish a communication link with the web server.

The releasing module 68 is configured to release the communication link with the web server if the access request message is not received from the mobile terminal within a predetermined period of time.

Figure 8:
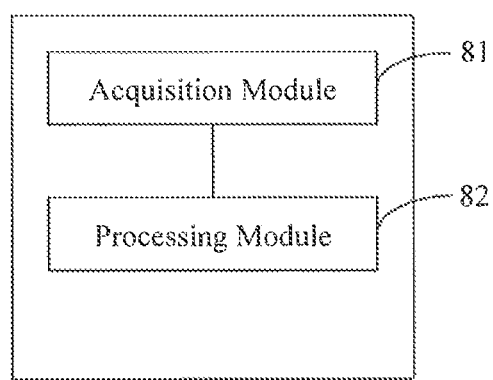
FIG. 8 is a block diagram of an apparatus for binding a token key to an account, according to an exemplary embodiment.

FIG. 8 is a block diagram of an apparatus 800 for binding a token key to an account at a mobile terminal, according to an exemplary embodiment. Referring to FIG. 8, the apparatus 800 includes an acquisition module 81 and a processing module 82.

The acquisition module 81 is configured to acquire display information from a web server. The display information may be generated by the web server based on a certification link and a first token key received from a security authentication server.

The processing module 82 is configured to generate encrypted information based on the first token key, and send to the security authentication server an access request message including the encrypted information and the certification link. The security authentication server may subsequently send the encrypted information to the web server after receiving the access request message.

In some embodiments, the processing module 82 may include a first processing unit configured to use the first token key as the encrypted information. In other embodiments, the processing module 82 may include a second processing unit configured to generate the encrypted information by performing a hash operation based on a timestamp and the first token key.

In other embodiments, if display information is generated by the web server, the processing module 82 may include a third processing unit configured to generate the encrypted information by performing a hash operation based on the first token key and the account, or a fourth processing unit configured to generate the encrypted information by performing the hash operation based on timestamp, the first token key and the account.

Figure 9:
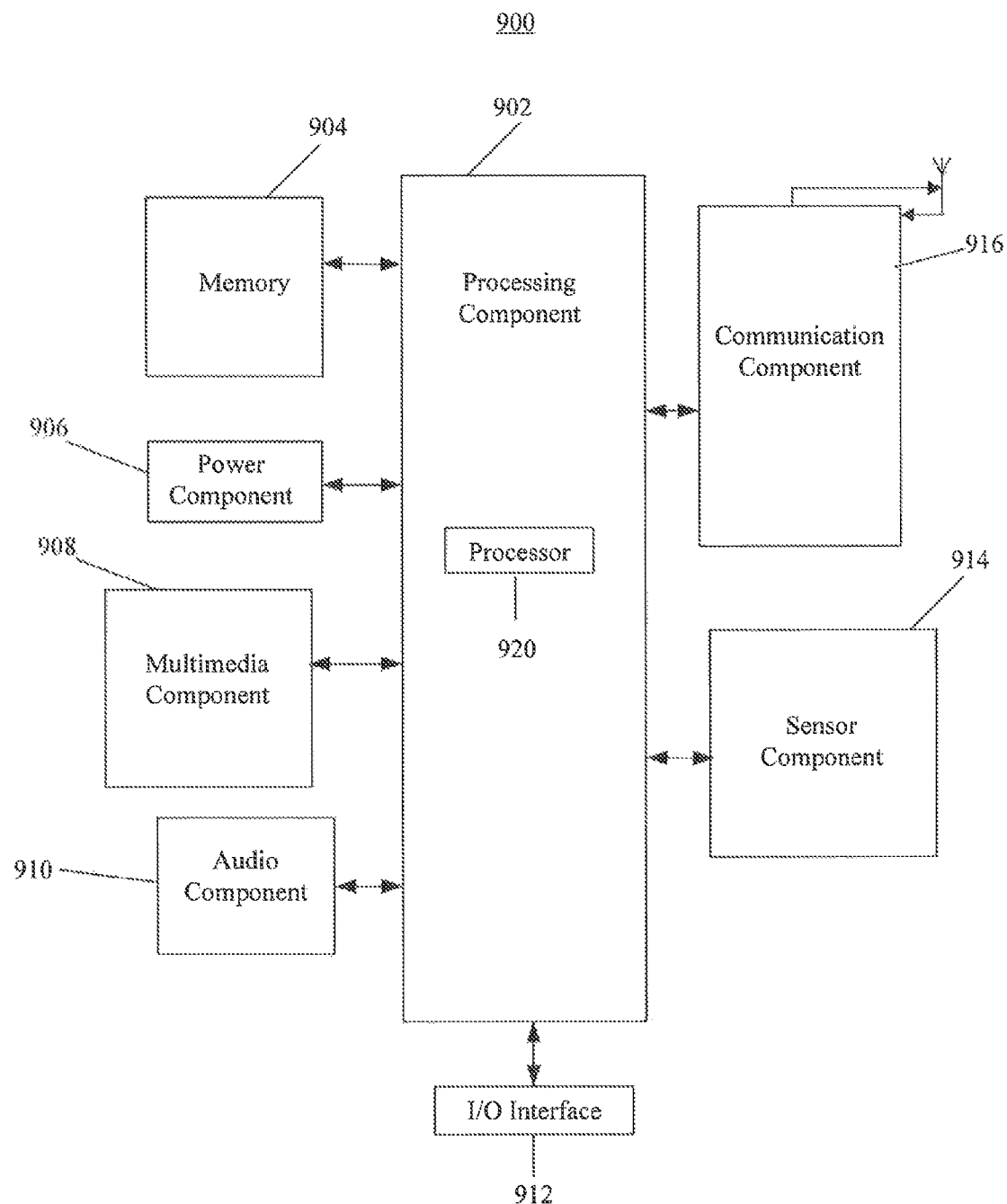
FIG. 9 is a block diagram of a mobile terminal, according to an exemplary embodiment.

FIG. 9 is a block diagram of a mobile terminal 900 for binding a token key to an account, according to an exemplary embodiment. For example, the mobile terminal 900 may be a mobile phone, a computer, a digital broadcast terminal, a messaging device, a gaming console, a tablet, a medical device, exercise equipment, a personal digital assistant and the like.

Referring to FIG. 9, the mobile terminal 900 may include one or more of the following components: a processing component 902, a memory 904, a power component 906, a multimedia component 908, an audio component 910, an input/output (I/O) interface 912, a sensor component 914, and a communication component 916. The person skilled in the art should appreciate that the structure of the mobile terminal 900 as shown in FIG. 9 does not intend to limit the mobile terminal 900. The mobile terminal 900 may include more or less components or combine some components or other different components.

The processing component 902 usually controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the mobile terminal 900. Examples of such data include instructions for any application or method operated on the mobile terminal 900, contact data, phonebook data, messages, pictures, videos, etc. The memory 904 is also configured to store programs and modules. The processing component 902 performs various functions and data processing by operating programs and modules stored in the memory 904. The memory 904 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 is configured to provide power to various components of the mobile terminal 900. The power component 906 may include a power management system, one or more power sources, and/or other components associated with the generation, management, and distribution of power in the mobile terminal 900.

The multimedia component 908 includes a screen providing an output interface between the mobile terminal 900 and the user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, slips, and gestures performed on the touch panel. The touch sensors may not only sense a boundary of a touch or slip action, but also sense a period of time and a pressure associated with the touch or slip action. In some embodiments, the multimedia component 908 includes a front camera and/or a rear camera. The front camera and/or the rear camera may receive an external multimedia datum while the mobile terminal 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 may include a microphone (MIC) configured to receive an external audio signal when the mobile terminal 900 is in an operation mode, such as a call mode, a recording mode, and/or a voice identification mode. The received audio signal may be further stored in the memory 904 or transmitted via the communication component 916. In some embodiments, the audio component 910 further includes a speaker to output audio signals.

The I/O interface 912 provides an interface between the processing component 802 and peripheral interface modules, such as a keyboard, a click wheel, a button, and the like. The button may include, but not limited to, a home button, a volume button, a starting button, and a locking button.

The sensor component 914 includes one or more sensors to provide status assessments of various aspects of the mobile terminal 900. For instance, the sensor component 914 may detect an on/off status of the mobile terminal 900, relative positioning of components, e.g., the display and the keyboard, of the mobile terminal 900, a change in position of the mobile terminal 900 or a component of the mobile terminal 900, a presence or absence of user contact with the mobile terminal 900, an orientation or an acceleration/deceleration of the mobile terminal 900, and/or a change in temperature of the mobile terminal 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the mobile terminal 900 and other devices. The mobile terminal 900 can access a wireless network based on a communication standard, such as WiFi, 2G, or 3G, or a combination thereof. In one exemplary embodiment, the communication component 916 receives a broadcast signal or information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In exemplary embodiments, the mobile terminal 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 904, executable by the processor 920 in the mobile terminal 900, for performing the above described methods. For example, the non-transitory computer-readable storage medium may be a ROM, a random access memory (RAM), a CD-ROM, a magnetic tape, a floppy disc, an optical data storage device, and the like.

Figure 10:
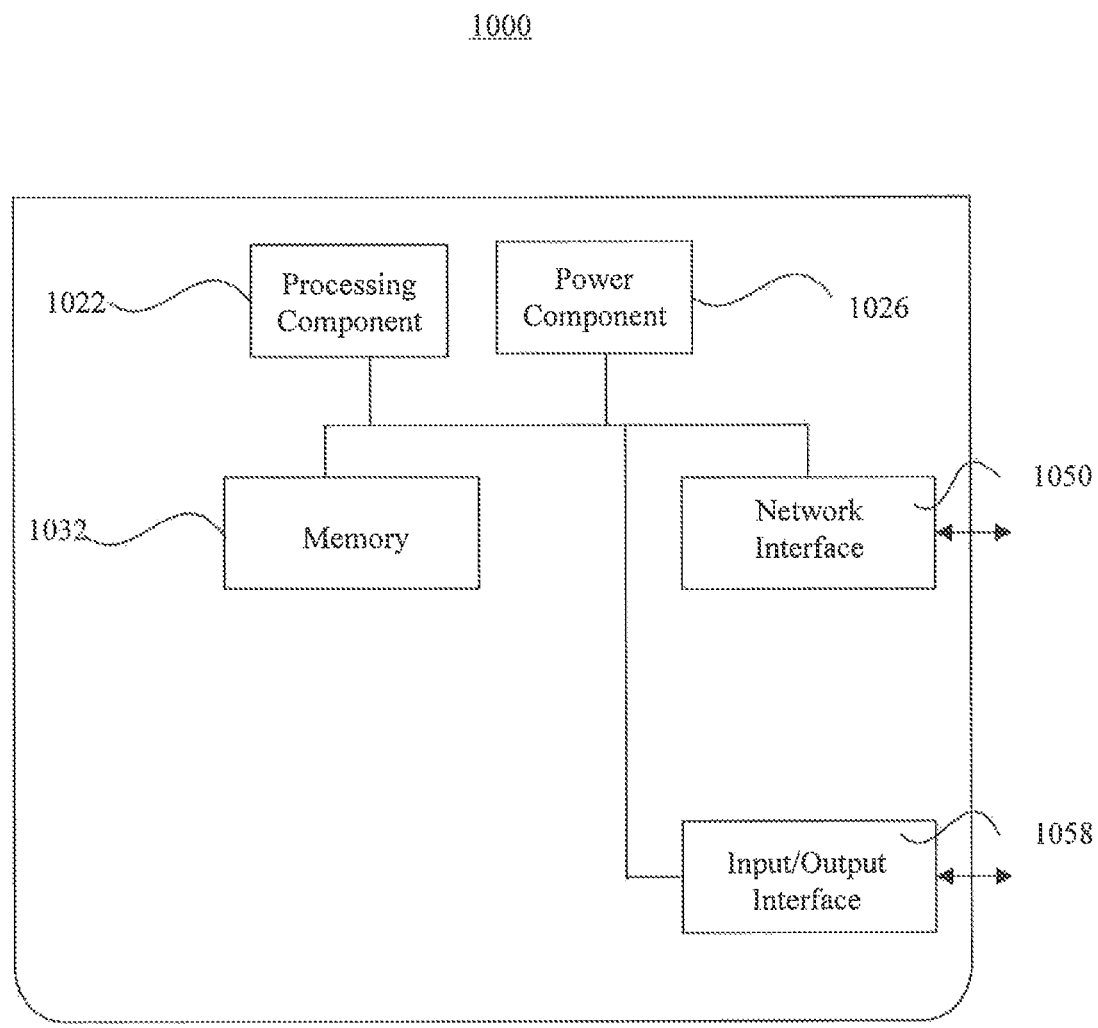
FIG. 10 is a block diagram of a server, according to an exemplary embodiment.

FIG. 10 is a block diagram of an apparatus 1000 of binding a token key to an account according to an exemplary embodiment. For example, the apparatus 1000 may be provided as a server, such as a security authentication server and/or a web server. As shown in FIG. 10, the apparatus 1000 includes a processing component 1022 that further includes one or more processors, and memory resources represented by a memory 1032 for storing instructions, such as application programs, executable by the processing component 1022. The application programs stored in memory 1032 may include one or more modules, each of which corresponds to a set of instructions. Moreover, the processing component 1022 is configured to execute instructions for performing the above described methods.

The apparatus 1000 may also include a power component 1026 configured to perform power management of the apparatus 1000, wired or wireless network interface(s) 1050 configured to connect the apparatus 1000 to a network, and an input/output (I/O) interface 1058. The apparatus 1000 may operate based on an operating system stored in the memory 1032, such as Windows Server™, Mac OS X™, Unix™, Linux™, FreeBSD™, or the like.

It should be understood by those skilled in the art that the above described methods, devices, and modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. It is intended that the specification and examples be considered as exemplary only, with a true scope and spirit of the invention being indicated by the following claims.

It should be understood that the present disclosure is not limited to the exact structures that are described above and shown in the accompanying drawings, and may be modified and changed without departing from the scope of the present disclosure. It is intended that the scope of the invention only be limited by the appended claims.

What is claimed is:

1. A method for binding a token key to an account, comprising:
sending, from a first server to a second server, a binding request message including information regarding the account, for the second server to generate a certification link and a first token key corresponding to the account;

receiving, at the first server, the certification link and the first token key from the second server;

generating, by the first server, display information based on the certification link and the first token key; sending, by the first server, the display information to a mobile terminal, wherein the mobile terminal acquires the certification link and the first token key based on the display information;

receiving, by the first server, encrypted information from the second server, wherein the encrypted information is generated according to the first token key and included in an access request message from the mobile terminal to the second server, and wherein generating the encrypted information comprises performing a hash operation based on a timestamp, the first token key, and the account;

obtaining, by the first server, a second token key based on the encrypted information;

determining, by the first server, that the second token key matches the first token key; and sending, by the first server, a binding success message to the second server.

2. The method according to claim 1, wherein the obtaining of the second token key comprises:
performing a hash operation based on the encrypted information.

3. A method for binding a token key to an account, comprising:
receiving display information from a first server, wherein the display information is associated with a certification link and a first token key generated by a second server according to the account;

acquiring the certification link and the first token key based on the display information;

generating encrypted information based on the first token key, wherein the generating of the encrypted information comprises performing a hash operation based on a timestamp, the first token key, and the account, to generate the encrypted information; and sending to the second server an access request message including the encrypted information and the certification link, wherein the second server sends the encrypted information to the first server for obtaining a second token key and determining whether the second token key matches the first token key.

4. The method according to claim 3, wherein the generating of the encrypted information comprises:
performing a hash operation based on a timestamp and the first token key, to generate the encrypted information.

5. The method according to claim 3, wherein the generating of the encrypted information comprises:
performing a hash operation based on the first token key and the account, to generate the encrypted information.

6. The method according to claim 3, wherein the generating of the encrypted information comprises:
using the first token key as the encrypted information.

7. A web server, comprising:
a processor; and
a memory for storing instructions executable by the processor;
wherein the processor is configured to:
send, to a security authentication server, a binding request message including information regarding an account, for the security authentication server to generate a certification link and a first token key corresponding to the account;

receive the certification link and the first token key from the security authentication server;

generate display information based on the certification link and the first token key;

send the display information to a mobile terminal, wherein the mobile terminal acquires the certification link and the first token key based on the display information;

receive encrypted information from the security authentication server, wherein the encrypted information is generated according to the first token key and included in an access request message from the mobile terminal to the security authentication server, and wherein generating the encrypted information comprises performing a hash operation based on a timestamp, the first token key, and the account;

obtain a second token key based on the encrypted information;

determine that the second token key matches the first token key; and send a binding success message to the security authentication server.

8. The web server according to claim 7, wherein the processor is further configured to:
obtain the second token key by performing a hash operation based on the encrypted information.

9. A mobile terminal, comprising:
a processor; and
a memory for storing instructions executable by the processor;
wherein the processor is configured to:
receive display information from a first server, wherein the display information is associated with a certification link and a first token key generated by a second server according to an account;

acquire the certification link and the first token key based on the display information;

generate encrypted information based on the first token key, wherein the processor is further configured to perform a hash operation based on a timestamp, the first token key, and the account, to generate the encrypted information; and send to the second server an access request message including the encrypted information and the certification link, wherein the second server sends the encrypted information to the first server for obtaining a second token key and determining whether the second token key matches the first token key.

10. The mobile terminal according to claim 9, wherein the processor is further configured to:
perform a hash operation based on a timestamp and the first token key, to generate the encrypted information.

11. The mobile terminal according to claim 9, wherein the processor is further configured to:
perform a hash operation based on the first token key and the account, to generate the encrypted information.

12. The mobile terminal according to claim 9, wherein the processor is further configured to:
use the first token key as the encrypted information.

* * * * *